United States Patent [19]
Reilly

[11] 3,747,625
[45] July 24, 1973

[54] METHOD AND APPARATUS FOR VENTING AND RELEASING PLASTIC ARTICLES FROM A BLOW MOLD

[75] Inventor: Joseph R. Reilly, Naugatuck, Conn.

[73] Assignee: Monsanto Company, St. Louis, Mo.

[22] Filed: Nov. 27, 1970

[21] Appl. No.: 93,338

Related U.S. Application Data

[62] Division of Ser. No. 802,539, Feb. 26, 1969, Pat. No. 3,640,671.

[52] U.S. Cl. ............................................. 137/102
[51] Int. Cl. ............................................ B29c 17/07
[58] Field of Search................ 137/102, 107, 512.3; 425/387 B

[56] References Cited
UNITED STATES PATENTS

| | | | |
|---|---|---|---|
| 493,984 | 3/1893 | Crickler | 65/261 X |
| 661,574 | 1/1900 | Corbett | 137/107 |
| 3,306,450 | 2/1967 | Kryzer et al. | 137/102 |
| 1,647,532 | 11/1927 | Lorenz | 65/261 |
| 3,511,271 | 5/1970 | Pollinger et al. | 137/512.3 |
| 3,556,123 | 1/1971 | Smith | 137/107 |

Primary Examiner—Robert G. Nilson
Attorney—Michael J. Murphy

[57] ABSTRACT

In a blow molding machine, a blow head assembly which includes a housing having valve means therein for rapidly exhausting the blowing gas from the mold cavity after formation of the article without withdrawing the assembly from registry with the mold opening. The assembly also may include a recessed blow head to facilitate removing the blown article from the mold. Use of the blow head involves establishing a seal therein with an end portion of the parison during blowing which is broken by the opening movement of the mold sections to permit the article to fall cleanly away from the mold.

3 Claims, 4 Drawing Figures

Patented July 24, 1973  3,747,625

INVENTOR
JOSEPH R. REILLY
BY
Michael J. Murphy
ATTORNEY:

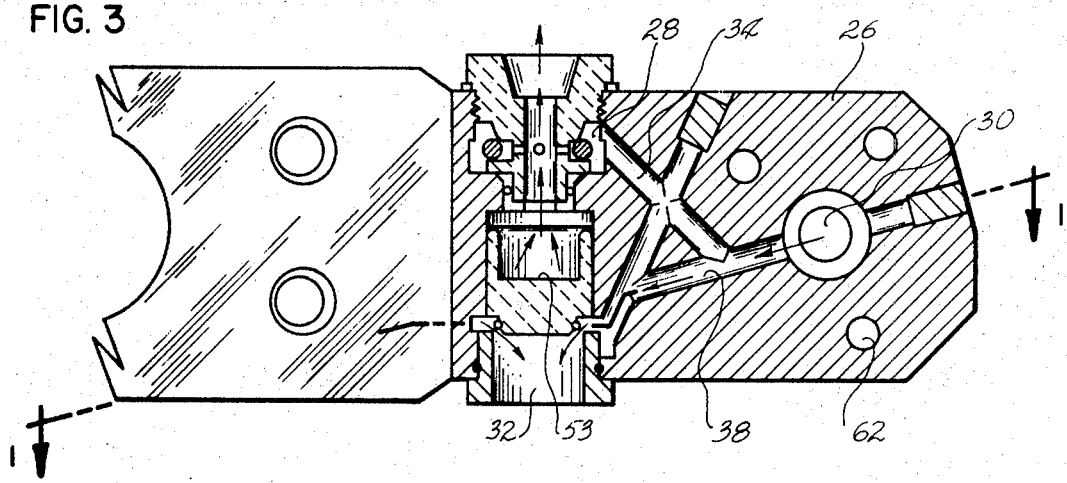
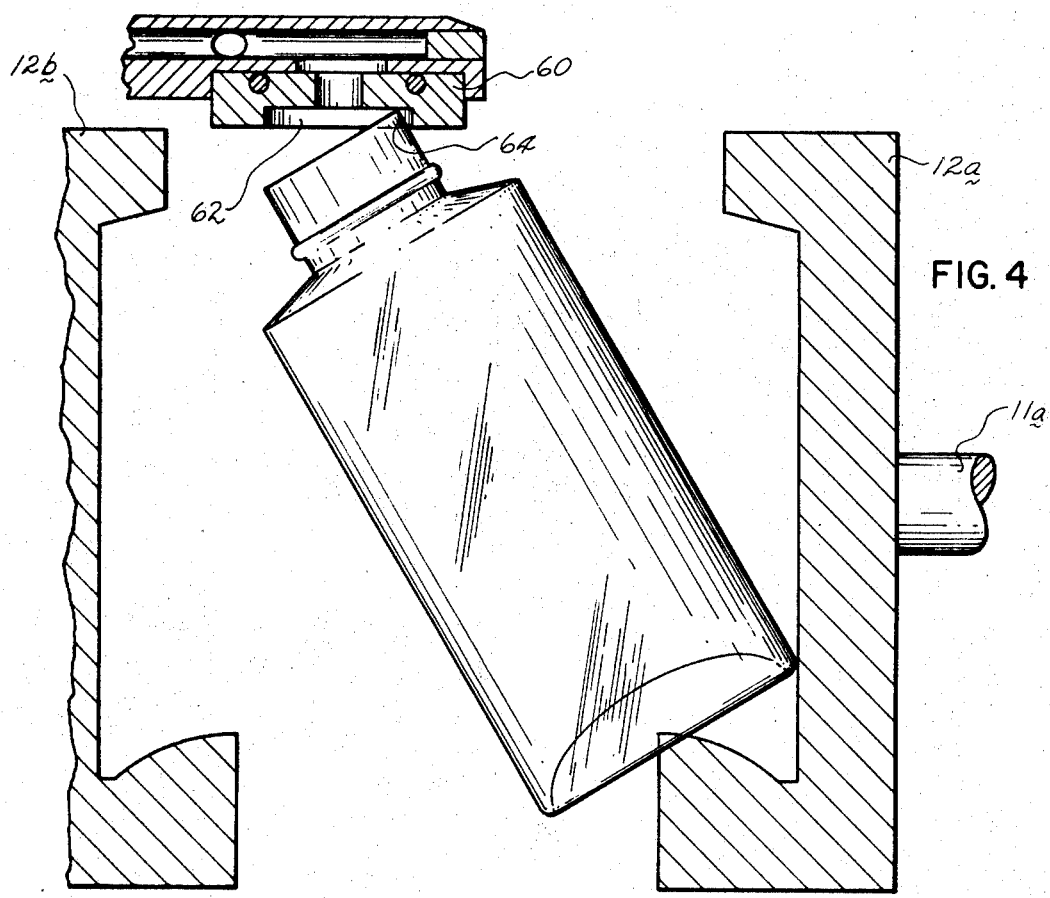

METHOD AND APPARATUS FOR VENTING AND RELEASING PLASTIC ARTICLES FROM A BLOW MOLD

This is a division of copending application Ser. No. 802,539, filed Feb. 26, 1969, now U.S. Pat. No. 3,640,671.

This invention relates to blow molding and in particular to a blow head assembly for improving the efficiency of the forming cycle in a blow molding operation.

In recent years, blow molding of plastic containers is usually being carried out, for economic reasons, in a continuous or semi-continuous automated manner, for example, according to the technique disclosed in U.S. Pat. No. 2,952,034. With this approach a plurality of like molds mounted on the peripheral margin of a revolving table are continuously indexed, one after the other, beneath the outlet of an extruder head from which a tubular parison of molten thermoplastic is issuing. The mold sections close around a portion of the parison which is then severed from the extrusion head, whereupon a blow assembly is positioned over the enclosed parison for introducing pressurized gas thereinto to expand the parison against cool walls of the mold cavity. The pressurized gas is usually retained within the parison as the mold travels around the circular path defined by the revolving table to insure that the plastic is kept forced against the surfaces of the cavity walls for cooling purposes. For this reason, the blow air is left on the parison as long as possible, usually until the mold has just about traveled a full circular path, whereupon it is opened at a reject station to release the article at a temperature as close as possible to that of the cavity walls, and is then almost immediately indexed under the extrusion head to accept the next charge. It follows that if the blowing efficiency, i.e. the portion of the total forming cycle during which the blowing air is acting on the enclosed parison, can be increased for a given installation, then the rate of plastic extrusion and therefore the container output capacity of the installation can be increased by an amount proportional to the increase in the blowing time, yet the blown articles will still be discharged from the mold at the same temperature as that existing prior to increasing the blowing time.

In prior installations of the type above described, the blow assembly is pivoted upwardly, for example 90° away from the top of the mold at the article eject station to permit exhausting the blow air to the surroundings through the mold opening, whereupon a reject pin is usually reciprocated downwardly into the opening before the halves retract. When the mold then opens, the formed article which tends to follow one half or the other strikes the central pin and falls away by gravity. After that particular mold encloses the next parison section to begin another cycle, the blow assembly associated with that mold must again be pivoted 90° downwardly before the blowing portion of the cycle can commence. These pivotal blow assembly and eject pin movements consume a distinct incremental portion of the blowing cycle which affects the output of the installation.

Now there has been developed a technique for extending the blowing portion of the forming cycle of a blow molding process, thereby providing for an increase in the output capacity of a blow mold installation.

Accordingly it is a principal object of this invention to provide improvements in a blow molding machine.

Another object of this invention is to provide an increase in the output capacity of a blow molding machine.

An additional object of this invention is to increase the blowing portion of the forming cycle in an automated blow molding process.

A further object of this invention is to decrease the movement of the blowing assembly during the forming cycle of a blow molding process.

Another object of this invention is to provide an improved technique for removing a blown article from its forming mold.

A still further object of this invention is to provide an improved blow head assembly for the blow mold stations of a blownware forming machine.

Another object of tis invention is to provide method and means to carry out the above objects which can be readily incorporated into existing equipment without substantial costly revisions.

Other objects of this invention will in part be obvious and will in part appear hereinafter.

These and other objects are provided in a container blow molding machine by means of the combination comprising a blow mold including complementary mold halves defining a cavity having the shape of a container to be molded therein and including an inlet passage formed in the mold halves extending through one end of the mold, a blow head assembly including a housing having an outlet in registry with the inlet passage of the blow mold for directing pressurized fluid thereinto, a support for the housing, and valve means in the housing for rapidly exhausting the pressurized fluid from the blow mold through the housing while the outlet of the housing remains in registry with the inlet passage of the blow mold.

In another aspect of the invention the blow head assembly includes a recessed head portion adapted to overlie the inlet passage of the mold and within which a seal is formed with a protruding end section of a parison which is enclosed within the mold on expanding the parison into the shape of a container. On retracting the mold halves the expanded parison follows one of the mold sections which breaks the seal with the recessed head and allows the expanded parison to fall away and separate freely from the blow mold station.

In describing the overall invention, reference will be made to the accompanying drawings in which:

FIG. 3 is a sectional view similar to FIG. 2 taken along the line 3—3 of FIG. 1, showing the position of the components after formation of a container; and FIG. 4 is a schematic, elevational view of the apparatus as the formed container is being separated from the mold.

Figure 1:
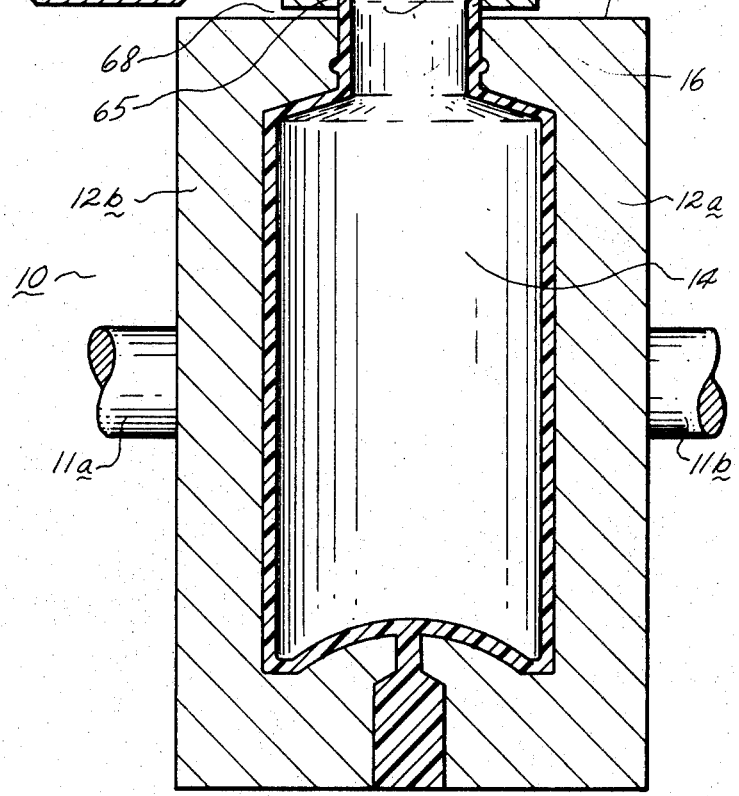
FIG. 1 is a sectional, elevational view of the blow head assembly of this invention taken along the line 1—1 of FIG. 3 showing the blow mold in place.
Figure 2:
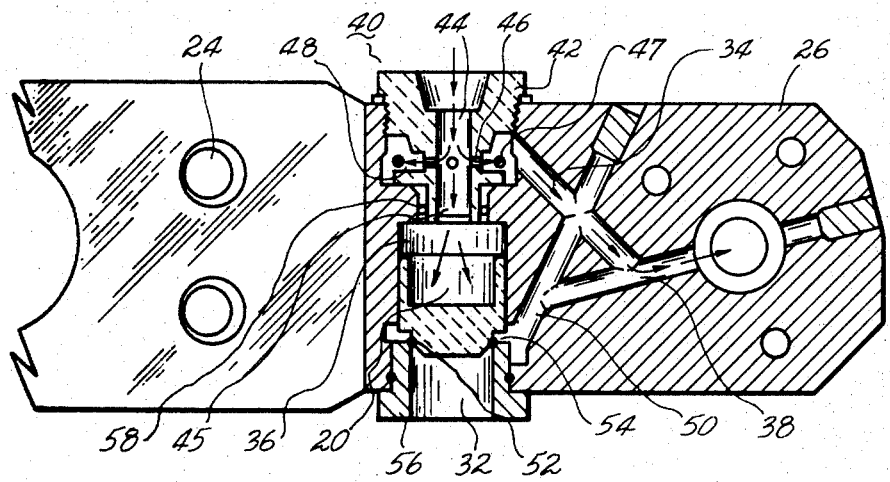
FIG. 2 is a sectional plan view of the blow head assembly showing the position of the components during formation of a container in the blow mold.

Referring now to the drawings, wherein identical numerals refer to identical parts there is shown in FIG. 1 a blow mold 10 which includes complementary mold halves 12a and 12b defining a cavity 14 having the peripheral contour of the container to be molded therein. Mold 10 includes an inlet passage 16, one half of which is formed in each mold half 12a and 12b, and which includes as its lower portion, the contour defining the container neck. Passage 16 extends through end face 18 of mold 10, which in FIG. 1 is the upper end, though in the alternative it could be the lower end. Conventional actuating means (not shown) attached to shafts 11a and 11b may be provided to move halves 12a and 12b toward and away from each other.

Blow head assembly 20 includes a support arm 22 having a series of holes 24 in which bolts may be inserted for attaching the assembly to a suitable rotatable support of the type illustrated, for example, in U.S. Pat. No. 2,952,034. Such a support, in turn, renders arm 22 rotatably mounted and thereby adapted to index over passage 16 of mold 10 in the manner depicted in FIG. 1.

Assembly 20 further comprises housing 26 on arm 22 through which pressurized fluid is directed to passage 16 of mold 10 to expand a thermoplastic parison situated therein into the shape of a container. Housing 26 also includes a pressurized fluid inlet port 28, a pressurized fluid exit port 30 alignable with the opening of passage 16 in blow mold 10, and a pressurized fluid exhaust port 32 for venting the fluid from the mold after expansion of the parison therein. Housing 26 also has three passageways which interconnect the inlet, outlet and exhaust ports and which comprise first passageway 34 between inlet port 28 and exhaust port 30, second passageway 36 between inlet port 28 and exhaust port 32 and third passageway 38 between exit port 30 and exhaust port 32. Valve means are provided in housing 26 for rapidly exhausting the pressurized fluid from the blow mold through the housing while the outlet of the housing remains in registry with inlet passage 16 of blow mold 10. These valve means include first valve means 40 in housing 26 responsive to the pressure of the fluid to open first passageway 34 and to obstruct first passageway 34 on release of the pressure. First valve means 40 functions as a check valve and is situated in inlet port 28. It comprises body 42 having a cylindrical bore 44 therein, the lower end 45 of which opens into second passageway 36. Body 42 has a plurality of openings 46 providing communication between bore 44 and inlet or entry port 28. Though a plurality are shown, only one such opening 46 is required when utilizing a valve of this type. First valve means 40 further includes an annular resilient O-ring 47 which in its relaxed, unpressurized position (FIG. 3) snugly seats in channel 48 to seal openings 46 and close off communication between bore 44 and inlet port 28. This construction of first valve means 40 renders it a normally closed valve.

Also included within housing 26 is a second valve means 50 for closing exhaust port 32 when passageway 34 is open and for opening exhaust port 32 when passageway 34 is obstructed. Second valve means 50 may be considered to be a quick exhaust or dump valve. Second valve means 50 situated in second passageway 36 functions as a movable piston having an annular sealing ring 52 on its outer surface which, in the valve deactivated position, rests against inclined surface 54 of valve seat 56 which, when threaded into housing 26, forms exhaust port 32 thereof. Exhaust seal 58 is stationary and is seated in second passageway 36 between the wall of the body 42 of first valve means 40 and the opposing wall of housing 26 to prevent fluid from escaping between these parts.

Surrounding and situated in a downwardly opening cavity below outlet port 30 in housing 26 (FIG. 1) is a recessed blow head 60 which may be demountably attached by conventional bolts (not shown) in holes 62 to housing 26. This facilitates rapidly changing the diameter of circular recess 62 which is coaxial with outlet port 30 in housing 26 during blowing. Such changes are necessary to accommodate the particular size of mold inlet passage 16 for the bottle being molded at any given time. A seal ring 61 is provided between the blow head and the housing. Though a separate blow head 60 is shown mounted in housing 26, obviously a recess properly sized and formed as a part of the lower end of the housing will accomplish the same result.

In operation, a tubular parison of molten thermoplastic is extruded in the conventional manner and is clamped between halves 12a and 12b of blow mold 10. In the preferred environment of operation, mold 10 is one of a plurality of like molds mounted on and spaced from each other around the outer margin of a rotary table. The molds and table are situated beneath a vertically reciprocating extrusion head which on its downward stroke deposits a portion of a continuously extruding parison between the open mold halves and then moves upwardly while the molds close on the parison portion and the table indexes one position to bring another mold into place below the extruder head. After the mold halves close on the parison, blow assembly 20, one of which is provided for each mold, is rotated by means of arm 22 so that blow head 60 is coaxial with inlet passage 16 of mold 10. The vertical movement of blow assembly 20 at this stage of the process is minimal, i.e. only that necessary to clear the short protruding end portion 64 of the enclosed parison which extends upwardly beyond the top face 18 of the mold. After the blow assembly is in place in the position shown in FIG. 1, pressurized fluid, e.g. air of 50–90 psig., is admitted to entry port 28 of housing 26 from a source through suitable valves which may be either manually or automatically operated by means of electric timers, solenoids, cams, pneumatic cylinders, switches, etc. in a manner well known to those skilled in the art. The pressure of the fluid acting on resilient O-ring 47 of first valve means 40 through openings 46 forces it radially outwardly, thus opening first passageway 34 to the passage of the fluid therethrough. The fluid exits through port 30 and enters mold 10 through passage 16 thereof to expand the enclosed parison therein outwardly against the walls of the mold cavity in a conventional manner well known to those skilled in the art. Cooling fluid is circulated through appropriately disposed channels in the mold block for reducing the temperature of the walls of the cavity in order to set the plastic after expansion.

The pressurized fluid also acts through open ended bore 44 of first valve means 40 on second valve means 50 to force sealing ring 52 against surface 54 of valve seat 56 and thus close off exhaust port 32 of the housing to the flow of fluid during the portion of the forming cycle when the pressurized fluid is acting on the enclosed parison. During this portion of the cucle, there exists an open path defined by the inlet port 28 of housing 26, first passageway 34, exit port 30, passage 16 and cavity 14 of mold 10, and second passageway 38 of the housing. Consequently, the fluid pressure acting on surface 53 of piston 50 is the same as that acting on the annular outer surface of ring 52. However, because of the dimensional relationships of the two (surface 53 being greater than that of ring 52) the force component of the pressure acting on surface 53 is greater than that acting on ring 52 and consequently piston valve 50 stays in a downward, seated position.

After the expanded parison has been sufficiently cooled by contact with the cool walls of the mold cavity, and while the mold is being indexed from position to position along a circular path defined by the revolving table toward the container eject station, a conventional control valve (not shown) upstream of the blow head assembly is positioned so as to prevent further fluid from flowing to or through the blow head assembly. This positioning may be by means of a conventional four way valve so that the conduit supplying air to the blow assembly is open to atmosphere at the valve, whereupon the pressurized fluid within housing 26 in passageway 36 is vented from the blow head assembly and the pressure reduced to atmospheric in this passageway. This low pressure condition causes sealing ring 47 to contract inwardly thereby closing off openings 46 and obstructing first passageway 34 from passage of any further fluid therethrough. The pressure remaining in third passageway 38 which is open to the interior of the closed mold 10, acts upon annular ring 52 of second or dump valve means 50, thus driving the piston back toward first valve means 40, thereby providing an open channel for the blow air within the mold to rapidly vent through exhaust port 32 of housing 26. In actual practice the vent time is a matter of a portion of a second, being approximately equivalent to that occurring when the blow head is lifted and the blow air is allowed to exhaust through the opening in the mold. Exhaust port 32 is positioned with respect to the extruding parison (not shown) such that the blow air is vented from the mold in a direction away from the extruding parison, thus avoiding contact of the latter with the blowing gas. With prior approaches, the blow gas was allowed to spew from the mold opening when the blow head was lifted away from the mold, and this would set up chilled portions in the extruding parison and cause a freely pendant parison to swing laterally which in turn would result in its misalignment in the mold with an attendant increase in flash generation. After the mold is vented, the blow head assembly is merely rotated away from the top of mold 10 and subsequently rotated back again into registry with passage 16 after another parison portion has been enclosed by mold 10 to commence another cycle. A slight clearance 68 is provided between the lower face of blow head 60 and the top face 18 of mold 10 when the blow head is aligned opposite passage 16, in order to avoid rubbing, wearing contact between the two components which would occur when the blow head assembly is rotated into and out of registry with the mold.

Regarding functioning of blow head 60 of the blow head assembly, as the enclosed parison is expanded within mold 10 by means of the pressurized fluid, so likewise is end portion 64 of the parison expanded outwardly against surface 65 of blow head 60, thereby establishing a seal with the parison in this area. As depicted in FIG. 4, as the mold halves start to retract, the slight upwardly concave shape of the bottom wall of the mold cavity traps the adjacent similarly configured bottom wall of the formed container therein in one mold half or the other, so that the lower end of the bottle is pivoted laterally about the upper seal while blow head 60 remains stationary. As retraction continues, this lateral movement breaks the upper seal between the short end portion 64 of the parison and the surface of recessed head 60, thus allowing the bottle to freely separate or topple from the mold without requiring the use of separate equipment such as reciprocating pins to aid in ejecting the formed container, and which require the blow head assembly to be moved out of registry with the mold before they function.

The above description and particularly the drawings are set forth for purposes of illustration only and are not to be taken in a limited sense.

Though the improved blow head assembly of the present invention has been described with respect to a horizontally rotating table type of blow molding machine, it is likewise applicable to other types of blowing installations, such as, e.g. a vertically mounted wheel or a reciprocating table as the mold support surface. One blow head assembly is preferably provided for each mold in a multi-station blowing installation.

Though single passages have been depicted connecting the three ports of the housing of the blow head assembly, obviously two or more parallel passages located side by side and communicating with the ports would also be adequate. The intent of the invention is to provide means for venting the pressurizing fluid as quickly as possible from the closed mold with a minimum or no movement of the blowing assembly, and toward this end as much open vent area as can be structurally accommodated in the housing should be provided.

The various inter connected flow passages are preferably located in a horizontally oriented housing having a minimum of vertical height (1 ½– 3 inches) when utilized with a vertical extrusion and a rotary support table system. This type of configuration minimizes interference between the lower end of the extruding parison and the top of the housing of the blow head assembly as the latter is being rotated into position over the mold after closing.

The present invention provides a novel type of blow head assembly for rapidly exhausting blowing air from the interior of a blow mold in order to minimize movement of the blow head assembly and maximize the portion of the forming cycle during which the blow air pressure is maintained on the hot plastic within the mold. Also provided is a unique seal which in combination with conventioanl mold geometry assures a simple, trouble free, falling away of the formed container from the mold during retraction of the halves in a container eject station. In actual practice in an existing blow molding installation, the improvements of the present invention have provided an increase in container output capacity of about two units per minute, which is substantial in view of the rather minor modifications required to existing equipment.

Although the invention has been described with reference to a preferred method and apparatus, it will be apparent to those skilled in the art that the invention is not limited to the embodiment specifically illustrated in the drawings of the application. Those skilled in the art of forming articles from tubular thermoplastic with the benefit of this invention may readily envision additions, deletions, substitutions and modifications which would be consistent with or equivalent to the form of the invention hereinafter described.

What is claimed is:

1. In a container blow molding machine, a blow head assembly comprising:
   a rotatably mounted arm;
   a housing on said arm for directing pressurized fluid to a blow mold;
      said housing having an inlet port, an exit port adapted to be aligned with an opening in a blow mold and an exhaust port for venting the fluid from the mold;
      said housing having three passageways which interconnect the inlet, outlet and exhaust ports; first valve means in the housing responsive to pressure to open one of said passageways between the inlet and exit ports and to obstruct said one passageway on release of said pressure; and second valve means in the housing for closing the exhaust port when said one passageway is open and for opening said exhaust port when said one passageway is obstructed.

2. The machine of claim 1 wherein the first valve means is a check valve having at least one normally closed port therein communicating with said one passageway.

3. The machine of claim 1 wherein the second valve means is a piston in the passageway of the housing between the inlet and exhaust ports, said piston having an annular ring on its outer surface which seats against an inclined surface of said exhaust port.

* * * * *